July 4, 1939.  F. A. FURLONG  2,164,511
HEATING SYSTEM
Filed March 2, 1934  2 Sheets-Sheet 1

Inventor
Francis A. Furlong
by M. W. McEnulty
Attorney

July 4, 1939.  F. A. FURLONG  2,164,511
HEATING SYSTEM
Filed March 2, 1934   2 Sheets-Sheet 2

Inventor
Francis A. Furlong
by M. W. McConkey
Attorney

Patented July 4, 1939

2,164,511

UNITED STATES PATENT OFFICE 2,164,511

HEATING SYSTEM

Francis A. Furlong, Chicago, Ill., assignor to Autogas Corporation, Chicago, Ill., a corporation of Delaware Application March 2, 1934, Serial No. 713,666

14 Claims. (Cl. 236—1)

This invention relates to heating systems, and is illustrated as embodied in a system having novel automatic means for modulating or varying the supply of fuel to maintain a substantially constant temperature.

In most heating systems, a definite supply of gas or other fuel is maintained, for example by means such as a fixed orifice and a pressure regulator, giving a fixed rate of burning of the fuel when it is turned on. This rate is based on the heat loss of the building in extremely cold weather, together with a sufficient margin so that the temperature will pick up rapidly when the fuel is first turned on.

In milder weather, especially, this means that the heating plant is entirely shut off for a considerable part of the time. One object of the present invention is to permit the modulation or variation of the system, preferably without changing the standard installations of heating plant and control devices and room thermostat, to permit the plant to operate in mild weather at a reduced rate but for a greater part of the time. Previous methods of reducing the rate of burning in mild weather have involved attempts to regulate or limit the flow of fuel by manual adjustment of a control valve, which is difficult to accomplish accurately and which involves danger of flash-backs, etc., or by special complicated arrangements of by-passes and the like.

According to an important feature of my invention, the heating plant is provided with an auxiliary control which automatically gives a modulated "high-and-low" operation in mild weather, without interfering with the standard full operation in severe weather, and preferably without the necessity of any manual adjustment or control.

In one desirable arrangement, the auxiliary control is actuated, for example under the control of a novel circuit opened and closed by the room thermostat, to alternately open and close an auxiliary valve which operates in connection with a by-pass around the valve to give high and low operation of the heating plant. One feature of the invention relates to arranging this valve to serve also as a pressure regulator for the fuel, when it is in open position.

Preferably this auxiliary valve is arranged in series with the main valve which controls the fuel supply, the main valve operating with an on-and-off cycle and the auxiliary valve and its by-pass having a high-and-low cycle, both being in the preferred arrangement controlled by the room thermostat.

I prefer to use a room thermostat having two contacts which open and close at different temperatures, and which may be a standard two-blade bimetallic thermostat. In this case, the main valve is turned on when both contacts are closed by the dropping of the room temperature to a predetermined minimum, and is turned off when both contacts open when the room temperature attains a predetermined maximum; while between these temperatures, when one contact is open and the other closed, the heating plant is automatically operated on a high-and-low cycle by the auxiliary valve or its equivalent.

The illustrated auxiliary valve in itself embodies substantial novelty, particularly in its adaptation to serve as a fuel pressure regulator when in open position, in an arrangement by which it is operated by the pressure of the fuel by a novel utilization of a sensitive control device which actuates a small control valve admitting or cutting off the pressure of the fuel on the diaphragm or other operating member of the auxiliary valve, and in several arrangements for giving the desired cycle of operation to the auxiliary valve. I prefer an arrangement in which the control circuit includes a heating unit which operates a bimetallic element to open and close the fuel-pressure connection, and which may if desired operate in stages or sections so that the cycle is faster at lower temperatures than at higher temperatures. However, many of the advantages can be secured by using a solenoid or the like to control the connection.

The above and other objects and features of the invention, including various novel arrangements and combinations and desirable particular constructions, will be apparent from the following description of the illustrative constructions shown in the accompanying drawings, in which.

Figure 1:
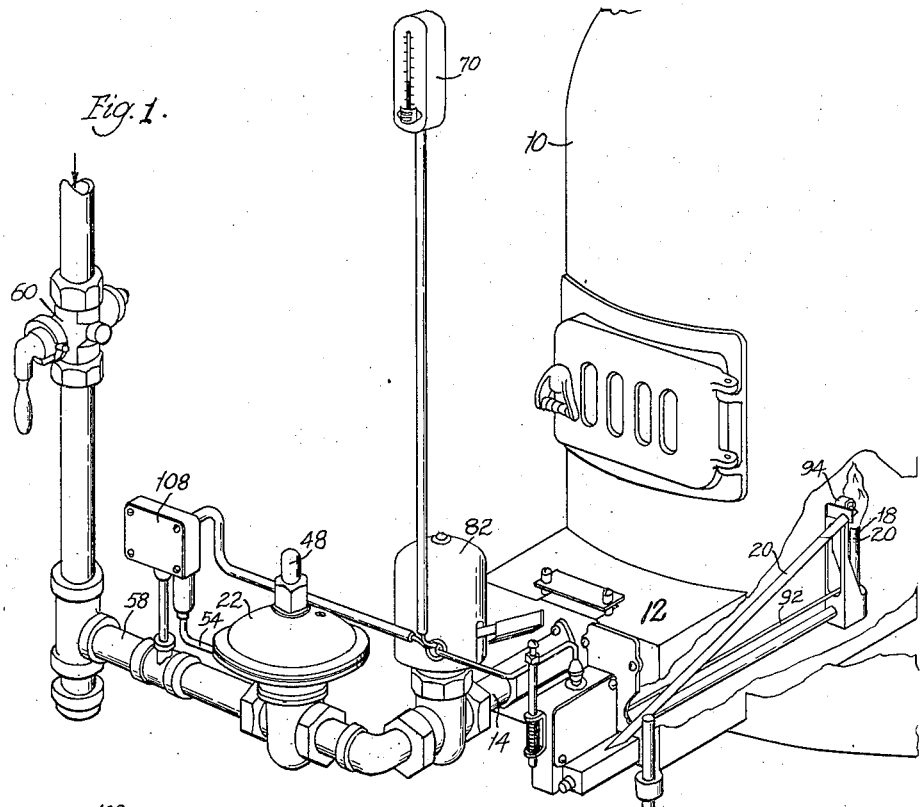
Figure 1 is a diagrammatic partial perspective view of a heating plant with its fuel supply, and embodying a form of my control means adapted for automatic control.
Figure 2:
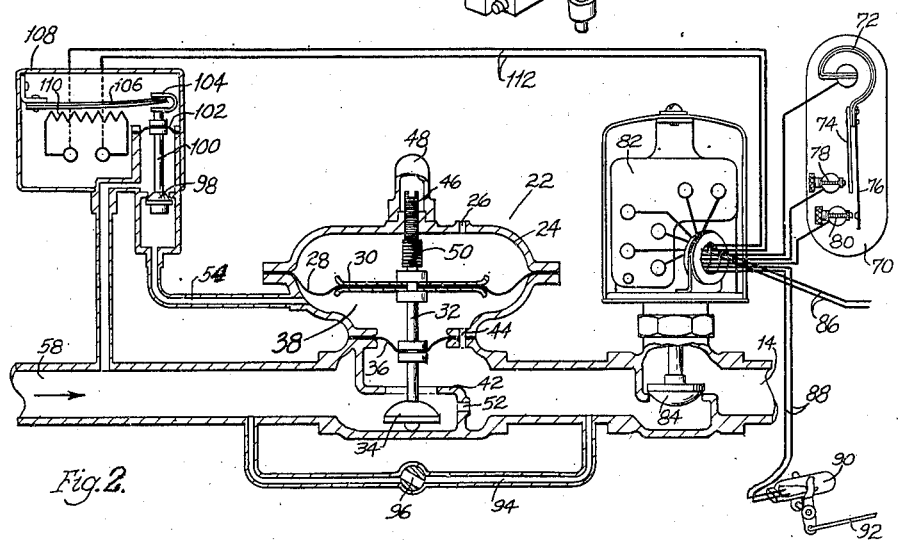
Figure 2 is a section through the fuel conduit and control valves of Figure 1, with the wiring diagram added thereto.

The arrangement of Figures 1 and 2 shows a heating system including a heating plant 10 shown as being substantially as fully described in my applications Nos. 679,521 and 695,248, filed respectively July 8, 1933, and October 26, 1933. This heating plant, in the form illustrated, includes a conversion gas burner 12, supplied with gas fuel by means such as a conduit 14 having a pilot 18 and a lighter 20 for the pilot. These parts are fully described in said applications Nos. 679,521 and 695,248.

The supply of fuel to the conduit 14 is controlled by a novel combination pressure regulator and auxiliary or secondary valve 22, shown in section in Figure 2. This device includes a two part casing 24, with an opening 26 to the atmosphere in the upper part, and with a flexible diaphragm 28 secured at its margin between the halves.

The diaphragm 28 is clamped at its center between plates 30, to which is secured a stem 32 of a valve 34. The stem 32 has a sealing diaphragm 36 which, with the main diaphragm 28, forms a pressure space 38 in the lower part of the casing 24.

The valve 34 cooperates with a seat 40 in a wall or partition 42, closing the valve in its upper position and restricting it more or less as it approaches its closed position. The pressure space 38 communicates on the side next the heating plant 10 by a restricted passage 44 with the conduit 14. Thus when the valve is open, the diaphragm 28 is actuated by the pressure on the heating plant side of the valve to raise and lower the valve 34 in such a manner as to restrict the flow of fuel in such a manner as to preserve a substantial uniform pressure of fuel in the conduit 14. Thus the device has for one of its functions to serve as a pressure regulator.

The regulator may be set for different pressures by means such as an adjustable threaded abutment 46, normally covered by a removable cap 48, and which bears against a spring 50 which bears in turn against the upper side of the diaphragm 28. Fluttering of the valve is restrained by the damping action due to the small size of the passage 44.

The partition 42 is also shown provided with a by-pass passage 52, which affords a minimum flow of fuel when valve 34 is closed. Thus, according to whether the valve 34 is closed or open, if the main valve 16 is open the flow of fuel is modulated between a "low" or minimum flow determined by the passage 52 and a "high" or maximum flow obtained by adding to that minimum the flow through the valve seat 40.

The valve 34 is preferably opened or closed by the pressure of the fuel on the side opposite the heating plant, for example by connecting the space 38 by means of a connection or small conduit 54, with a main supply conduit 58. The supply conduit 58 may have a shut-off valve 60, or other means suitably located for shutting off the fuel supply in the summer months.

Operation of the heating plant is controlled according to room temperature by a thermostat 70 including a bimetallic thermostatic element 72 fixed at one end and carrying at the other end two blades 74 and 76 forming electric contacts which close successively, at different temperatures, against fixed contacts 78 and 80.

The contacts 78 and 80 and the fixed end of the element 72 are electrically connected by three wires with a standard reversible valve motor 82 of well-known construction, which is arranged to open and close a main valve 84 which controls the supply of fuel to the conduit 14. Current is supplied for the electrical circuits from a suitable transformer or other source, through leads 86.

When a circuit is completed through the motor 82 it operates to open the valve 84, retaining the valve open as long as it is energized. When the motor is de-energized the valve will close due to the action of gravity or a spring (not shown) in the motor or both.

As explained in my above-mentioned application No. 679,521, the current is also passed, as a safety measure, through leads 88 from a mercury or other switch 90 operated by a connection 92 from a thermostat 94 adjacent the pilot 20, so that the valve cannot be opened unless the pilot is burning.

In the operation of the device, as the temperature in the room falls the thermostat 70 is affected, until eventually both blades 74 and 76 engage their contacts 78 and 80, thereby closing a circuit which (if the pilot 20 is burning and the switch 90 is closed) causes the operation of the valve motor 82 to open the valve 84. As also explained in said application No. 679,521, the motor in opening the valve automatically closes a switch in the usual way, to close an auxiliary "holding" circuit including the one of contacts 78 and 80 which opens at the higher temperature and the connection from the fixed end of the element 72.

Thus until both of the blades 78 and 80 break their contacts, i. e., until the room temperature reaches a predetermined upper limit, usually 72°, the "holding" circuit remains closed, and motor 82 holds the valve 84 open. When the temperature in the room exceeds this maximum, the valve 84 is closed. Thus as far as the automatic main valve 84 is concerned, the heating plant is operated with an on-and-off cycle.

In series with the main valve 84 is the combination pressure regulator and modulating valve 22. In the form illustrated, in addition to the passage 52 as a matter of convenient adjustment the by-pass means includes a by-pass conduit 94 controlled by a manually-operated adjustable valve 96.

In this secondary or auxiliary valve, the valve-operating connection 54 is shown controlled by an auxiliary valve 98 having a stem 100 sealed by means such as a diaphragm 102, and terminating in a hooked part 104 embracing the free end of a bimetallic element 106 fixed at its opposite end and enclosed in a casing 108.

The element 106 has arranged adjacent thereto an electric heating unit, indicated diagrammatically as a resistance 110. This unit is connected by leads 112 in series with the above-described "holding" circuit.

Figure 3:
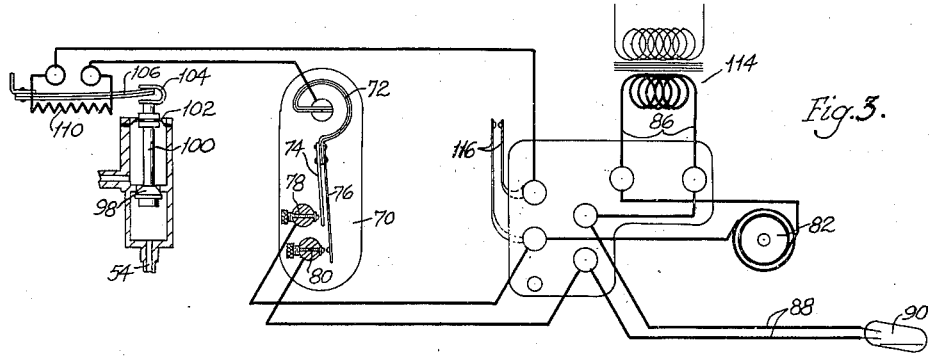
Figures 3, 4, 5 and 6 are wiring diagrams of modified arrangements.

The operation of the device will be apparent from the wiring diagram of Figure 3. In addition to the parts mentioned above, this diagram shows a transformer 114 supplying current to the leads 86, and a switch 116 of any suitable and well-known construction, in the connection 112, and which is closed in the usual manner by the motor 82 as it opens the valve 84.

It will be seen that switch 90 being closed, when both blades 74 and 76 engage their contacts 78 and 80, there is a direct circuit through the motor 82, and it is operated to open the valve. This circuit has relatively little resistance, and while the "holding" circuit is closed at this time in the usual manner through the switch 116 by the opening of the main valve, there is very little current flowing in it and the unit 110 is not substantially heated.

As soon as the contact at 78 is broken, i. e., usually when the room temperature rises from 70° to 70.5°, this main circuit is broken, but the "holding" circuit through the element 72 remains closed through switch 116 and the heating unit 110. This causes the heating of the unit 110, which in turn causes a slow downward warping of the element 106, gradually opening the valve 98 and thereby gradually closing the secondary valve 34, and cutting the supply of fuel from "high" to "low".

It will be noted that if the temperature again falls below 70°, the element 110 is short-circuited by the closing of the circuit at 78, valve 34 is again slowly opened, and the volume of fuel remains at "high" until the room temperature again reaches 70.5°. On the other hand, if the room temperature rises to 72°, both primary and "holding" circuits are opened, and valve 84 is closed.

Figure 4:
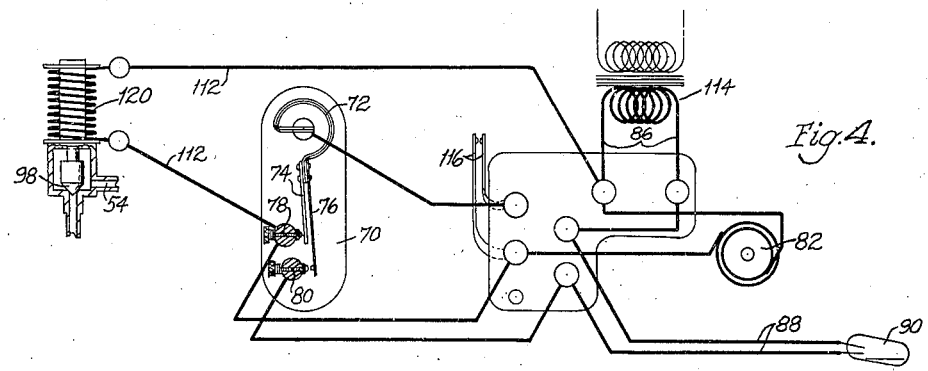

The arrangement of Figure 4 is the same as that described above, except that a solenoid 120 is operated by the circuit in leads 112, to operate the valve 98.

Figure 5:
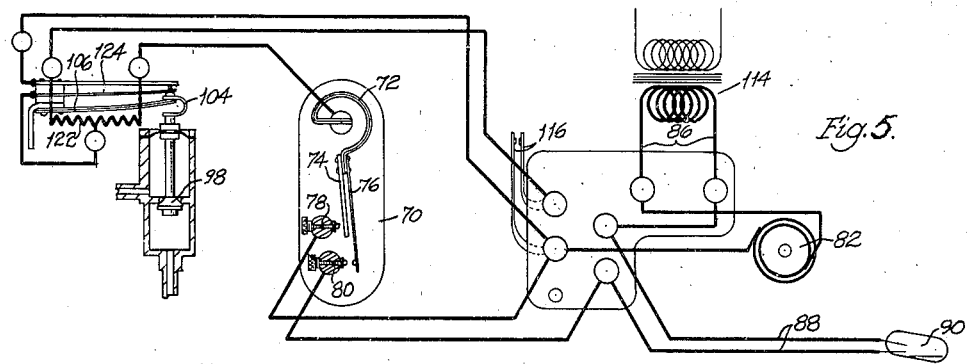

In the arrangement of Figure 5, as soon as the room temperature drops to 72°, and the blade 76 engages its contact 80, a circuit is closed from element 72 through the right-hand half of the heating element 122, through a yielding contact 124 held at that time closed by the thermostatic element 106, through the motor 82 and the transformer 114, through switch 90 (presumed to be closed with the pilot burning), back to the contact 80. This opens the valve 84, closing switch 116. At the same time the heating unit 122 has heated up the element 106, closing valve 34 and giving "low" operation very shortly after the burner has started, and has broken the contact 124 to break the main circuit.

The valve 34 is held closed, and valve 84 open, so long as only blade 76 engages its contact, by a holding circuit through switch 116 and the entire length of the heating unit 122.

If the heat, on "low", is not sufficient, the room temperature will drop until blade 74 engages its contact 78, whereupon the heating unit 122 is short-circuited, and element 106 cools, thereby opening valve 34 and giving "high" operation.

Figure 6:
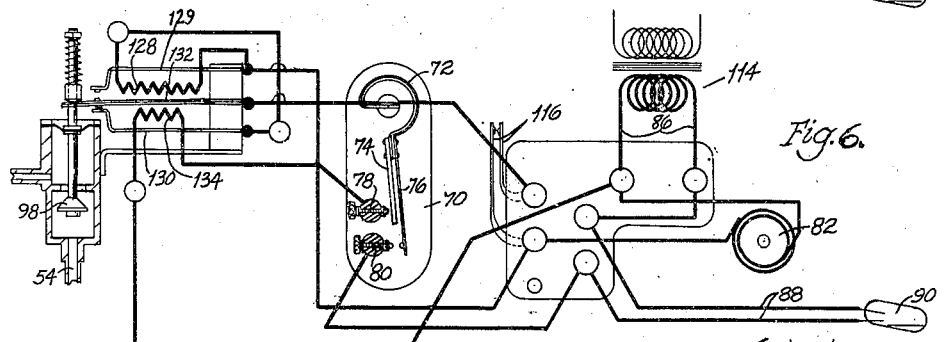

Figure 6 shows an arrangement in which the normal or cold position of the auxiliary valve 98 is open, with valve 34 therefore closed. This has the advantage that if the main valve 84 should stick in open position, the valve 34 would be closed and the fuel supply in "low" position even after both blades 74 and 76 break their contacts as the room gets too hot, instead of being in "high" at that time.

In this arrangement, when the room temperature drops to 72°, blade 76 engages its contact 80, closing a circuit through the motor 82 and transformer 114 and switch 90 (assumed to be closed), and through a heating unit 128 and a contact 130 yieldingly engaged by a bimetallic thermostatic element 132 which serves to complete the circuit to the element 72.

This closes the switch 116, and establishes a holding circuit which passes directly from element 72 to the switch 116, thence through motor 82 and transformer 114 and switch 90 back to contact 80. This holding circuit short-circuits the first circuit, so that the unit 128 is cut out, and the valve 34 is in closed position. Thus the system is, or may be if so adjusted, momentarily in "high", but drops back into "low" shortly afterwards, as the heat from 128 wears off and 132 reengages 130, for further operation.

As soon as the room temperature drops enough to close blade 74 against its contact 78, a circuit is closed through a second heating unit 134, causing the element 132 to warp and close the valve 98, thus opening the valve 34 and giving "high" operation.

In the Figure 6 arrangement, the dropping of the room temperature to the upper limit (e. g., 72°) closes the contact at 76—80, closing the circuit 80—90 (assumed to be "on")—114—82—128—130—132—72—76. This circuit is of comparatively great resistance, and not enough current passes to operate the motor 82 to open the main valve. However, it does heat up the unit 128, causing a warping of the blade 132 until after a predetermined time interval (e. g., ten minutes) the contact is closed at 132—129. During this interval, the yielding contact 130 follows the blade 132 upward, in contact therewith, until the contact at 129 is closed. Contact between 130 and 132 is not broken at any time.

The stop on the upper end of the stem of valve 98, engaged by blade 132, may be adjusted so that contact 129 is engaged (1) before valve 98 is lifted, or (2) during the lifting of valve 98, or (3) just after the valve 98 is closed. In case (1) the furnace starts up, as described below, with valve 34 closed and the fuel supply in "low". In case (3) the furnace starts up with valve 34 open and the fuel supply in "high". In case (2) the furnace may be arranged to start with valve 34 partly open.

When contact 129 is engaged, a circuit is closed through 80—90—114—82—129—132—72—76—80. This short circuits the resistance 128, a considerable current flows through motor 82, and the main valve opens. It will be noted that enough time has elapsed since the engagement of blade 76 with contact 80 to permit a slight further drop in room temperature, which causes a very firm contact at 76—80, obviating any possibility of a fluttering action.

The opening of the main valve by motor 82 at once closes the contact 116. This closes a holding circuit 80—90—114—82—116—72, which continues to short circuit the resistance 128 even after the contact 132—129 is broken. The resistance 128 and blade 132 cool off and break the contact 132—129 almost immediately after the furnace starts up, whereupon (if the parts are so adjusted that the furnace starts in "high") valve 98 opens, valve 34 closes, and the furnace drops to "low" operation.

The furnace then operates in "low" until either contact at 80 is broken by a rise in temperature, thereby closing the main valve and shutting the furnace off entirely, or the contact 74—78 is closed by a continued drop in the room temperature.

In the latter case a circuit is closed, in parallel with the "holding" circuit, through 80—90—114—134—78—74—76. This causes enough current to pass through the heating unit 134 (which is much lower in resistance than 128) to heat and warp the blade 132 to close valve 98, thereby opening valve 34, and causing the furnace to operate in "high". The heating plant then operates in "high" until a rising room temperature breaks the contact at 78—74, whereupon the system drops back to "low" operation.

Thus the complete cycle, starting with a room temperature above 72° and dropping, includes (1) the heating of unit 128 and warping of blade 132 to open valve 34 and (as usually adjusted) give a "high" setting but without starting the furnace, (2) upon closing of contact 132—129 after a predetermined time interval, the operation of the motor 82 to open the main valve and close contacts 116, (3) momentary operation in "high" (if so adjusted), followed almost immediately by (4) a drop to operation in "low"; (5) continued operation in "low" so long as and whenever blade 76 engages contact 80 and blade 74 does not engage contact 78, (6) operation in "high" whenever and so long as blade 74 engages contact 78, dropping back to stage (5) when this contact is broken, and (7) closing of the main valve and beginning the cycle over again whenever the room temperature, rising above 72°, breaks the contact 76—80.

As explained in my prior application No. 679,-521, referred to above, in all of the circuits described herein, if the pilot goes out or if the temperature inside the furnace rises to the danger point, the switch 90 is automatically operated to close the main valve and shut off the fuel supply entirely.

One of the safety features of the arrangement of Figure 8 is that if the main valve sticks, at least the fuel supply is at such a time necessarily in "low". This sticking of the main valve does not happen very often, but can be a very serious matter when it does happen, if not guarded against.

While several illustrative embodiments have been described in detail, it is not my intention to limit the scope of the invention to those particular embodiments, or otherwise than by the terms of the appended claims. The specific temperatures (viz. 70°, 70.5°, and 72°) referred to above are of course purely illustrative.

I claim:

1. A heating system comprising, in combination with a heating plant having a source of fuel supply, means controlling the supply of fuel from said source to said heating plant, auxiliary means for supplying a minimum amount of fuel independently of said controlling means, a control device controlling the supply of fuel to the heating plant from both said controlling means and said auxiliary means, and temperature-controlled means for turning on both the control device and the controlling means when room temperature drops below a predetermined temperature and for thereafter turning the controlling means on and off as the room temperature drops below and rises above a predetermined temperature and for turning off the control device if the room temperature rises above a higher predetermined temperature.

2. A heating system comprising, in combination with a heating plant having a conduit supplying fuel thereto, a secondary valve controlling the supply of fuel passing through said conduit to said heating plant, a by-pass around said secondary valve for supplying a minimum amount of fuel independently of said valve, a main valve controlling the supply of fuel to the heating plant from both said secondary valve and said by-pass and temperature-controlled means for turning on both the main valve and the secondary valve when room temperature drops below a predetermined temperature and for thereafter turning the secondary valve on and off as the room temperature drops below and rises above a predetermined temperature and for turning off the main valve if the room temperature rises above a higher predetermined temperature.

3. A heating system comprising, in combination with a heating plant having a source of fuel supply, means controlling the supply of fuel from said source to said heating plant, auxiliary means for supplying a minimum amount of fuel independently of said controlling means, a control device controlling the supply of fuel to the heating plant from both said controlling means and said auxiliary means, and temperature-controlled means for turning on both the control device and the controlling means when room temperature drops below a predetermined temperature and for thereafter turning the controlling means on and off as the room temperature drops below and rises above a predetermined temperature and for turning off the control device if the room temperature rises above a higher predetermined temperature, said temperature-controlled means comprising a room thermostat having two electrical contacts closing at different temperatures and electrical circuits controlled by said contacts and which include a first circuit closed by the closing of both contacts and means actuated by said circuit when closed to open both the controlling means and the control device to give a maximum supply of fuel to the heating plant, a second circuit closed by the opening of the control device and preventing the opening of the first circuit when one only of said contacts is broken by the rising room temperature, and an auxiliary circuit connected with said first circuit and having means for alternately opening and closing said controlling means as long as one only of said contacts remains closed.

4. A heating system comprising, in combination with a heating plant having a conduit supplying fuel thereto, a secondary valve controlling the supply of fuel passing through said conduit to said heating plant, a by-pass around said secondary valve for supplying a minimum amount of fuel independently of said valve, a main valve controlling the supply of fuel to the heating plant from both said secondary valve and said by-pass and temperature-controlled means for turning on both the main valve and the secondary valve when room temperature drops below a predetermined temperature and for thereafter turning the secondary valve on and off as the room temperature drops below and rises above a predetermined temperature and for turning off the main valve if the room temperature rises above a higher predetermined temperature, said temperature-controlled means comprising a room thermostat having two electrical contacts closing at different temperatures and electrical circuits controlled by said contacts and which include a first circuit closed by the closing of both contacts and means actuated by said circuit when closed to open both the main and secondary valves to give a maximum supply of fuel to the heating plant, a second circuit closed by the opening of the main valve and preventing the opening of the first circuit when one only of said contacts is broken by the rising room temperature, and an auxiliary circuit connected with said first circuit and having means for alternately opening and closing said secondary valve as long as one only of said contacts remains closed.

5. A control device comprising a pressure regulator having a valve which (when open) is moved more or less toward its seat according to the pressure on one side of the valve to maintain a uniform pressure on said side of the valve, a connection from the other side of the valve for closing the valve by fuel pressure, an auxiliary valve in said connection, a bimetallic element arranged to open and close the auxiliary valve by its change of shape as it is heated and cooled, and a control circuit having a heating element for heating said bimetallic element, said control circuit having two alternative paths for the current, utilizing different parts of the heating element to heat said element rapidly or slowly and thereby operating the auxiliary valve in a corresponding cycle.

6. A heating system comprising, in combination with a heating plant having a source of fuel supply, means for varying the amount of fuel from said source to said heating plant, a device for turning the fuel supply on and off regardless of the amount determined by said varying means, and a control system automatically turning said device "on" when the room temperature is at or below an upper predetermined temperature, and for turning said varying means to a "low" portion when the room temperature is between said upper temperature and a lower predetermined temperature and for turning said varying means to "high" position when the room temperature is below said lower predetermined temperature.

7. A heating system comprising, in combination with a heating plant having a source of fuel supply, means for varying the amount of fuel from said source to said heating plant, a device for turning the fuel supply on and off regardless of the amount determined by said varying means, a main control system automatically turning said device "on" when the room temperature is at or below an upper predetermined temperature, and an auxiliary control system for turning said varying means to a "high" position when the room temperature drops to said upper temperature and shortly thereafter automatically turning it to a "low" position and holding it there while the room temperature is between said upper temperature and a lower predetermined temperature and for turning said varying means to "high" position when the room temperature is below said lower predetermined temperature.

8. A heating system comprising, in combination with a heating plant having a source of fuel supply, means for varying the amount of fuel from said source to said heating plant, a device for turning the fuel supply on and off regardless of the amount determined by said varying means, and a control system automatically turning said device "on" when the room temperature is at or below an upper predetermined temperature, and for turning said varying means to a "low" position when the room temperature is between said upper temperature and a lower predetermined temperature and for turning said varying means to "high" position when the room temperature is below said lower predetermined temperature, said control system automatically turning the varying means to "low" position when the room temperature is above said upper temperature and said device is supposedly turned off.

9. A heating system comprising, in combination with a heating plant having a source of fuel supply, means for varying the amount of fuel from said source to said heating plant, a device for turning the fuel supply on and off regardless of the amount determined by said varying means, a main control system automatically turning said device "on" when the room temperature is at or below an upper predetermined temperature, and an auxiliary control system for turning said varying means to a "high" position when the room temperature drops to said upper temperature and shortly thereafter automatically turning it to a "low" position and holding it there while the room temperature is between said upper temperature and a lower predetermined temperature and for turning said varying means to "high" position when the room temperature is below said lower predetermined temperature, said auxiliary control system automatically turning the varying means to "low" position when the room temperature is above said upper temperature and said device is supposedly turned off.

10. A fuel-control device comprising a valve, a bimetallic blade having one end fixed and its other end operatively connected to the valve, a heating resistance adjacent the bimetallic blade, one circuit extending through the entire length of said resistance for heating said blade slowly, and another circuit extending through a part only of said resistance for heating the blade more rapidly.

11. A fuel-control device comprising a valve, a bimetallic blade having one end fixed and the other end operatively connected to said valve, contacts on opposite sides of said blade, and two electrical circuits both connected to a power source and to said blade and which are connected respectively in said contacts and heating resistances in said circuits, said resistances when heated effecting movements of said blade.

12. A heating system having a fuel supply comprising a passage provided with a valve which is opening and shut to give an on and off control, means responsive to the temperature of the space to be heated to control the operation of said valve, said passage being connected in series with two parallel passages, a valve in one of said last named passages, and temperature responsive means to control operation of said valve to give high and low control.

13. A heating system having a fuel supply comprising a passage provided with a valve which is opened and shut to give an on and off control, means responsive to the temperature of the space to be heated to control the operation of said valve, said passage being connected in series with two parallel passages, a valve in one of said last named passages, temperature responsive means to control operation of said valve to give high and low control, a pilot burner, and means responsive to said pilot burner to control both of said temperature responsive means.

14. A heating system comprising, in combination with a heating plant having a source of fuel supply, means controlling the supply of fuel from said source to said heating plant, auxiliary means for supplying a minimum amount of fuel independently of said controlling means, a control device controlling the entire supply of fuel delivered to the heating plant through both said controlling means and said auxiliary means, and temperature-controlled means for turning on both the control device and the controlling means when room temperature drops below a predetermined temperature and for thereafter turning the controlling means on and off as the room temperature drops below and rises above a predetermined temperature and for turning off the control device if the room temperature rises above a higher predetermined temperature.

FRANCIS A. FURLONG.